May 7, 1929.  D. J. RAYMOND  1,712,169
RIM CONTRACTING TOOL
Original Filed May 3, 1923
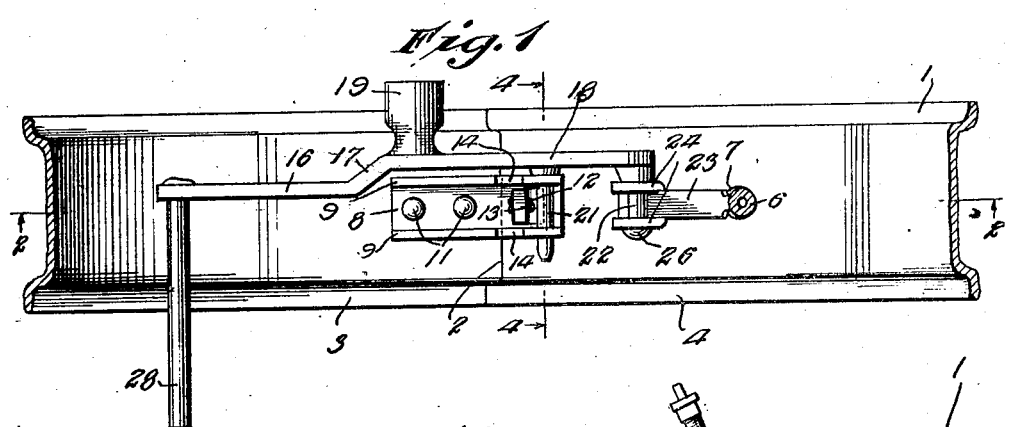
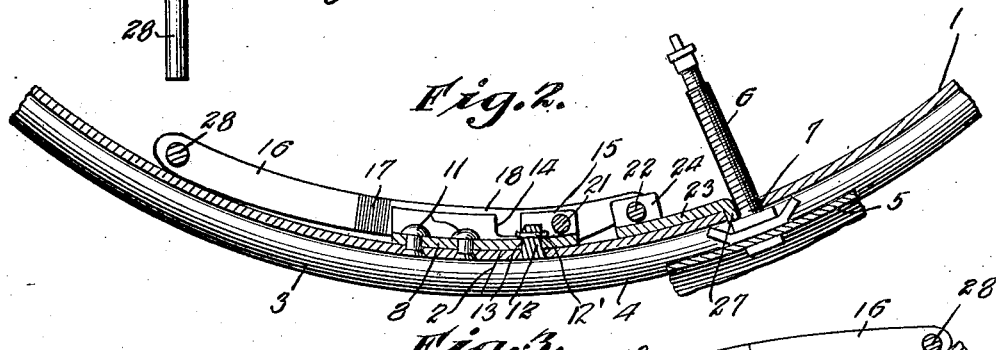
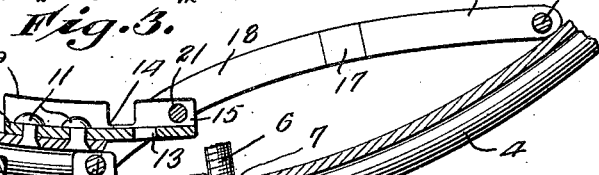
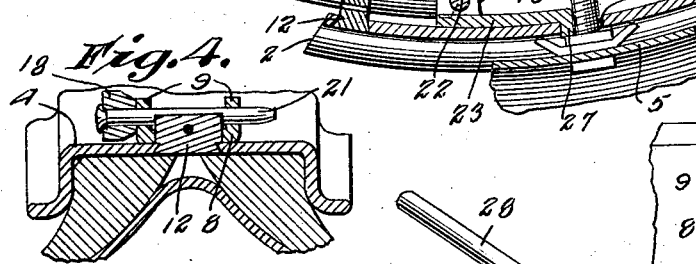
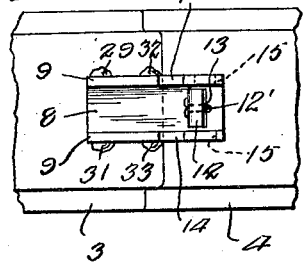
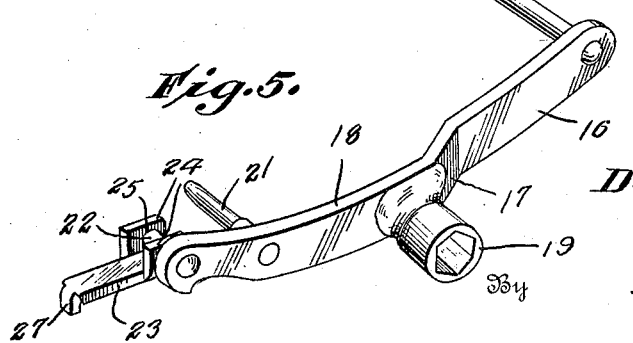
Inventor
Daniel J. Raymond
By Semmes & Semmes
Attorneys Patented May 7, 1929.

1,712,169

UNITED STATES PATENT OFFICE.

DANIEL J. RAYMOND, OF WRIGHTSTOWN, WISCONSIN.

RIM-CONTRACTING TOOL.

Application filed May 3, 1923, Serial No. 636,300. Renewed June 6, 1928.

My invention relates to rim contracting tools.

An object of my invention is to provide a rim contracting tool which is easily and cheaply made and which is strong and sturdy in construction.

Another object of my invention is to provide a tool whereby a demountable rim may be readily distorted and shrunk for the removal of a tire casing by means of a detachable operating tool, which may also be employed to remove the wedges that hold the rim.

Heretofore, it has been customary to employ means fastened to both sides of the split rim, and normally carried thereby, for the purpose of engaging with the shrinking tool or lever. This type of rim under certain conditions may prove cumbersome and the plurality of parts required increase the danger of injury. The costs of manufacture, replacement and repair of these rims are large. It is to overcome the disadvantages of the existing prior art devices that this invention has been conceived.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claim.

In order to make my invention more clearly understood, I have shown in the accompanying drawings means for carrying the same into practical effect without limiting the improvements in their useful applications to the particular constructions, which for the purpose of explanation, have been made the subject of illustration.

In the drawings:

Figure 1 is a top plan view of my demountable rim with the detachable operating tool in position for deforming the rim;

Fig. 2 is a view in longitudinal cross section of my device taken on the lines 2—2 of Fig. 1, looking in the direction of the arrows;

Fig. 3 is a longitudinal cross sectional view of my device on the lines 2—2 of Fig. 1, looking in the direction of the arrows, showing the position of the parts after the deformation and shrinking of the rim has been accomplished;

Fig. 4 is a cross sectional view taken on the lines 4—4 of Fig. 1, looking in the direction of the arrows;

Fig. 5 is a detailed perspective view of my detachable operating tool;

Fig. 6 is a top plan view of a modification of my device in which the support piece is shown fastened to one side of the split by means of spot welding.

Referring to the drawings, (Figs. 1 to 5 inclusive) I have illustrated a demountable tire rim 1 having a diagonal split 2 therein dividing the rim so as to provide two free ends 3 and 4. A tire 5, only a portion of the tube being shown, is adapted to be mounted on the outside of the rim 1 and a valve stem 6 protrudes through a tire valve hole 7 in the end 4 of the rim. Mounted on the end 3 of the rim is a support piece 8, preferably of integrally formed U-shaped metal, having upstanding sides 9.

The support piece 8 is attached by means of rivets 11, see Figs. 1, 2 and 3, to the end 3 of the rim. The rivets 11 are spaced along the length of the support piece 8 and firmly hold the support piece 8 against displacement in any direction. A portion of the support piece 8 in the position of the tire shown in Figs. 1 and 2 is adapted to extend beyond the split 2 and to normally lie in contact with the inner surface of the end 4 of the rim. The end 4 of the rim carries a latch 12 which is firmly fastened to the section 4, and is adapted to project through a slot 13 in the support piece 8 and firmly lock the two ends 3 and 4 together through the medium of a cotter key 12' or any other suitable pin projecting through the slot 13, as shown in Figure 6, when an inflated tire is in place on the rim. The upstanding sides 9 have adjacent cut out portions 14 within which is adapted to fit one of the bolts (not shown) which hold the rim to the felly in the usual manner, whereby the rim is prevented from slipping around the felly.

Near the ends of the upstanding sides 9 are adjacent holes 15 through which the pivot of the detachable operating lever is adapted to pass, as will now be described. The detachable operating lever is preferably formed of a flat metallic piece of metal 16 which is bent at 17 to enable the tool to clear the support piece 8. Beyond this bend is an offset portion 18. Mounted on the portion 18 is a socket wrench 19 to remove the wedges that hold the rim, thus giving the tool a double utility in that it may be used to demount a tire or remove the wedges. The entire length of the demountable tool has a slight bend, as indicated in Figs. 2, 3 and 5, to enable it to be readily placed in position on the interior of the split rim.

Mounted on the portion 18 of the detachable operating lever is an outstanding arm 21 firmly secured to the portion 18. The outstanding arm 21 is adapted to fit within the holes 15 in the upstanding sides 9 of the support piece 8. Near the extremity of the portion 18 of the operating lever is a stud 22 rigidly attached to the portion 18 of the lever. A link 23 is formed in upstanding sides 24, through which are drilled registering holes 25 through which passes the stud 22. The stud 22 acts as a fulcrum upon which the detachable operating lever is pivoted.

The link 23 is adapted to readily pivot on the stud 22 and is held in place by riveting the end of the stud 22, as indicated in Fig. 1 by the numeral 26. The upstanding arms 24 are preferably integrally formed with the link 23, and upon the other end of the link 23 is formed a downwardly projecting lug 27 which is adapted to engage the valve hole of the demountable rim and to pass between the valve stem 6 and the wall of the hole 7. A handle 28 is provided on the end of the portion 16 of the detachable operating lever.

In operation, the outstanding arm 21 is inserted within the holes 15 in the upstanding sides of the support piece 8. The lug 27 on the end of the link 23 is passed down into the valve stem hole 7 past the valve stem 6. The lug 27 is adapted to fit rather tightly between the wall of the hole 7 and the valve stem 6, and this tends to hold the link firmly during the early stage of the shrinking operation. The handle 28 is then lifted to deform the rim and the portions of the split rim take the position shown in Fig. 3, wherein the rim circumference is materially reduced and the tire casing may be readily removed. The lever action is quite powerful, since the distance between the stud 22 and the outstanding arm 21 is much less than the distance between the outstanding arm 21 and the handle 28.

As will be apparent, the detachable operating lever, by means of the link 23, provides its own firm support on the end 4 of the rim and it is unnecessary to have any auxiliary and permanently attached structure to aid the operation.

Referring to Fig. 6, I have shown a modification wherein the portion of the support piece attached to the end 3 of the demountable rim is materially shortened. This is accomplished by causing the support piece 8 to be attached to the end 3, by spot welding the support piece at the opposite points 29 and 31 at one end and opposite points 32 and 33 at the other end. This spot welding, by reason of its great strength, enables the amount of metal used in the support piece 8 to be materially decreased and yet insures great sturdiness and rigidity.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claim.

I claim:

A rim contracting tool comprising a lever, a plate pivoted to one end of the lever, a lug upon the free end of the plate, a lateral arm upon the lever adjacent to the pivotal end and a lateral handle upon the other end of the lever.

In testimony whereof I affix my signature.

DANIEL J. RAYMOND.